(12) United States Patent
Kwak

(10) Patent No.: US 11,746,736 B2
(45) Date of Patent: Sep. 5, 2023

(54) POWER CONTROL APPARATUS AND VEHICLE HAVING THE SAME

(71) Applicants: Hyundai Motor Company, Seoul (KR); Kia Corporation, Seoul (KR)

(72) Inventor: Hyo Geun Kwak, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 195 days.

(21) Appl. No.: 17/491,942

(22) Filed: Oct. 1, 2021

(65) Prior Publication Data
US 2022/0154679 A1  May 19, 2022

(30) Foreign Application Priority Data

Nov. 18, 2020 (KR) .......................... 10-2020-0154713

(51) Int. Cl.
| | |
|---|---|
| F02N 11/08 | (2006.01) |
| B60L 58/18 | (2019.01) |
| B60L 3/12 | (2006.01) |
| B60R 16/033 | (2006.01) |
| B60R 16/02 | (2006.01) |
| B60L 58/10 | (2019.01) |
| B60L 58/12 | (2019.01) |
| B60L 1/00 | (2006.01) |
| B60R 16/03 | (2006.01) |

(52) U.S. Cl.
CPC ............ *F02N 11/0866* (2013.01); *B60L 3/12* (2013.01); *B60L 58/10* (2019.02); *B60L 58/12* (2019.02); *B60L 58/18* (2019.02); *B60R 16/02* (2013.01); *B60R 16/033* (2013.01); *B60L 1/00* (2013.01); *B60L 2250/16* (2013.01); *B60R 16/03* (2013.01); *F02N 2300/304* (2013.01)

(58) Field of Classification Search
CPC ............ F02N 11/0866; F02N 11/0803; F02N 2300/304; F02N 2300/2011; B60L 3/12; B60L 3/0069; B60L 58/10; B60L 58/12; B60L 58/18; B60L 1/00; B60L 2250/16; B60L 2240/80; B60R 16/02; B60R 16/033; B60R 16/03; B60R 16/005; B60R 16/023; B60K 35/00; B60K 2370/152; B60W 10/06; B60W 40/105; B60W 50/14; B60W 2050/146; B60W 2520/10; B60W 2556/45; G06F 8/65
USPC ...................................... 123/179.28; 320/109
See application file for complete search history.

(56) References Cited

FOREIGN PATENT DOCUMENTS

| CA | 3111823 | * | 3/2020 | ............... H02J 13/00 |
| JP | 4140191 | * | 8/2008 | ................ H02P 9/30 |

* cited by examiner

*Primary Examiner* — Hai H Huynh
(74) *Attorney, Agent, or Firm* — Slater Matsil, LLP

(57) ABSTRACT

The disclosure relates to a power control apparatus and a vehicle having the same. The vehicle includes a storage, a plurality of loads configured to perform at least one function, a power control apparatus configured to cut off power supplied to the plurality of loads, respectively, and a controller configured to identify at least one load supplied with the power through the power control apparatus during execution of a parking mode for a preset period, and to match operation information of the identified at least one load with identification information of the at least one load and store it in the storage.

20 Claims, 10 Drawing Sheets

FIG. 4A

| ELECTRONIC DEVICE | FUNCTION | ELECTRONIC DEVICE CAN BE TURNED OFF | FUNCTION ALONE CAN BE TURNED OFF |
|---|---|---|---|
| A | A-1 | O | X |
| A | A-2 | O | X |
| B | B-1 | O | O |
| C | C-1 | X | X |
| D | D-1 | O | X |
| F | F-1 | O | O |
| ... | ... | ... | ... |

FIG. 4B

| VERSION | ELECTRONIC DEVICE | FUNCTION | ELECTRONIC DEVICE CAN BE TURNED OFF | FUNCTION ALONE CAN BE TURNED OFF |
|---|---|---|---|---|
| V1.25 | A | A-1 | O | X |
| V1.30 | A | A-2 | O | X |
| V1.0 | B | B-1 | O | O |
| V1.0 | C | C-1 | X | X |
| V1.0 | D | D-1 | O | X |
| V2.0 | D | D-2 | O | O |
| V1.5 | E | E-1 | O | O |
| V1.6 | F | F-1 | O | O |
| ... | ... | ... | ... | ... |

FIG. 5

| ELECTRONIC DEVICE | S/W VERSION | FUNCTION | LAST OPERATION TIME (TIME POINT) | NUMBER OF OPERATIONS AFTER START-OFF |
|---|---|---|---|---|
| A | V1.3 | A-1 | 00:00 | 3 |
| A | V1.3 | A-2 | 00:00 | 2 |
| B | V1.0 | B-1 | 00:00 | 0 |
| ... | ... | ... | ... | ... |

FIG. 6

| ELECTRONIC DEVICE | FUNCTION | ELECTRONIC DEVICE CAN BE TURNED OFF | FUNCTION ALONE CAN BE TURNED OFF | NUMBER OF USES DURING DURING PRESET PERIOD | LAST USE TIME |
|---|---|---|---|---|---|
| A | A-1 | O | X | 3 | 6 HOURS AGO |
| A | A-2 | O | X | 0 | 2 MONTHS AGO |
| B | B-1 | O | O | 0 | 2 MONTHS AGO |
| C | C-1 | X | X | 4 | 3 HOURS AGO |
| D | D-1 | O | X | 3 | 3 HOURS AGO |
| D | D-2 | O | O | 0 | 1 MONTH AGO |

FIG. 9

| ELECTRONIC DEVICE | FUNCTION | USER SETTINGS | BLOCK RECOMMENDATION | FUNCTION ACTIVATION TIME |
|---|---|---|---|---|
| A | A-1 | ON | X | 3 MINUTES |
| A | A-2 | ON | O | 1 HOURS |
| B | B-1 | OFF | O | 24 HOURS |
| C | C-1 | ON | X | 14 DAYS |
| D | D-1 | ON | X | 14 DAYS |
| D | D-2 | OFF | O | 4 HOURS |

POWER CONTROL APPARATUS AND VEHICLE HAVING THE SAME

CROSS-REFERENCE TO RELATED APPLICATIONS

This application claims priority under 35 U.S.C. § 119 to Korean Patent Application No. 10-2020-0154713, filed on Nov. 18, 2020, the disclosure of which is hereby incorporated herein by reference.

TECHNICAL FIELD

The disclosure relates to a power control apparatus for reducing a dark current and a vehicle having the same.

BACKGROUND

A vehicle is a moving means or transportation means for driving on a road and railway using fossil fuels and/or electricity as a power source. For example, the vehicle may be driven using power generated from an engine.

The vehicle may include a starter motor for starting the engine and a battery for supplying the power to the starter motor, and may further include a generator for charging a discharged battery.

The vehicle may further include a variety of electric field loads to protect a driver and provide convenience and fun to the driver. For example, the electric field loads may include a power steering, a seat heating wire, and a black box. Some of the electric field loads receive the power from the battery even in a parking state.

As a number of the electric field loads increases, a dark current during parking increases, causing a problem of not starting or shortening a life of the battery.

Here, the dark current may refer to a leakage current that is constantly consumed by the electric field load in an engine start-off state of the vehicle. For example, the dark current may refer to a current consumed in a 'sleep mode' of the electric field load.

In addition, when the vehicle is left in the parking state for a long time, there is a problem in that a durability of the battery decreases and a start-up failure occurs due to an over-discharge of the battery.

Currently, there is a problem that it is difficult to manage the dark current because there is no a technology for individually controlling the dark current of the electric field load in the parking state.

SUMMARY

An aspect of the disclosure is to provide a power control apparatus for controlling power supply of some of a plurality of loads in a parking mode, and a vehicle having the same.

Another aspect of the disclosure is to provide a vehicle for monitoring operating state of the plurality of loads in the parking mode, outputting information about the load to be operated in the parking mode as recommended information based on the monitoring result, and supplying power to the load selected by a user during the parking mode.

Additional aspects of the disclosure will be set forth in part in the description which follows and, in part, will be obvious from the description, or may be learned by practice of the disclosure.

According to an aspect of the disclosure, there is provided a power control apparatus including: a plurality of switches configured to be respectively connected to a plurality of loads; a storage configured to store identification information of the plurality of loads operable during execution of a first mode and identification information of at least one load operable during execution of a second mode, and to store identification information of the switches matched with the identification information of each load; and a controller configured to control turn-on of at least one switch among the plurality of switches to supply power of a battery to the at least one load based on the information stored in the storage during the execution of the second mode.

The controller may be configured to identify the load operating during the execution of the second mode, and to store information about identification information of the identified load, identification information of a function performed by the load, a number of operations, and a last operation time.

The controller may be configured to update the information stored in the storage based on the information about the stored identification information of the identified load, the identification information of the function performed by the load, the number of operations, and the last operation time during the execution of the first mode.

The at least one load may be some of the plurality of loads. The controller may be configured to control turn-off of the remaining switches so that the power supplied to the remaining loads is cut off during the execution of the second mode.

The controller may be configured to control the turn-on of the plurality of switches to supply power of a first power supply to the plurality of loads based on a current mode being the first mode, and to control the turn-on of the at least one switch to supply power of a second power supply including the battery to the at least one load based on the current mode being the second mode.

According to another aspect of the disclosure, there is provided a vehicle including: a storage; a plurality of loads configured to perform at least one function; a power control apparatus configured to cut off power supplied to the plurality of loads, respectively; and a controller configured to identify at least one load supplied with the power through the power control apparatus during execution of a parking mode for a preset period, and to match operation information of the identified at least one load with identification information of the at least one load and store it in the storage.

The controller may be configured to identify operation information for each function of each load operated during the execution of the parking mode for the preset period, based on the operation information for each function of the identified each load, determine whether there is a load to be cut off a power supply during the execution of the parking mode; and to update the information of the storage based on the identification information of the determined load based on determining that there is the load to be cut off the power supply during the execution of the parking mode.

The operation information for each function of each load may include the identification information of each load, identification information of the at least one function performed in each of the loads, information of the number of operations of the at least one function performed in each of the loads, and information about a last operation time of the at least one function performed in each of the loads.

The vehicle may further include an inputter; and a display. The controller may be configured to control the display to display blocking recommended information for a load that will cut off the power supply of the power control apparatus while performing the parking mode based on the operation information for each function of each load, to identify the load to cut off the power supply corresponding to a user input received through the inputter, and to update the information stored in the storage based on the identification information of the identified load.

The controller may be configured to determine whether a predetermined time has elapsed from a time point when a start-on command is received based on the start-on command being received, and to transmit the operation information for each function of each load in the parking mode to the power control apparatus based on determining that the predetermined time has elapsed from the time point when the start-on command is received.

The controller may be configured to delete the operation information for each function of each load in the parking mode based on receiving update success information from the power control apparatus, and to retransmit the operation information for each function of each load in the parking mode based on not receiving the update success information from the power control apparatus.

The vehicle may further include a speed detector configured to detect a driving speed. The controller may be configured to determine whether a predetermined time has elapsed from a time point when a start-on command is received based on the start-on command being received, to determine whether the driving speed detected by the speed detector is equal to or greater than a preset speed based on determining that the predetermined time has elapsed, and to transmit the operation information for each function of each load in the parking mode based on determining that the driving speed detected by the speed detector is equal to or greater than the preset speed.

Each of the plurality of loads may be configured to transmit the operation information to the controller based on determining that it has operated using the power supplied from the power control apparatus while performing the parking mode.

The loads operating by a wake-up of a communicator among the plurality of loads may be configured to transmit operation information for each function to the controller at an operation time point.

The loads operating according to preset time information among the plurality of loads may be configured to transmit operation information for each function to the controller at a start-on command or a wake-up time point of a communicator.

The vehicle may further include a communicator configured to perform a communication with a server. The controller may be configured to transmit information about the plurality of loads to the server based on receiving an initial start-on command, and to control updates of the plurality of loads based on update information of the plurality of loads received from the server and store information about the updates of the plurality of loads.

The vehicle may further include an inputter; and a display. The controller may be configured to update the information of the storage based on selection information in response to receiving the selection information of a function to be turned off during the parking mode through the inputter.

The vehicle may further include a communicator configured to perform a communication with a server. The controller may be configured to, based on determining that at least one electronic device has been replaced with another electronic device, control the update of the other electronic device by receiving a software for updating the other electronic device from the server, and to store update information of the other electronic device in the storage.

The vehicle may further include a communicator configured to perform a communication with a server. The controller may be configured to control the update of a new electronic device by receiving a software for updating the new electronic device from the server based on determining that it has been added as the new electronic device, and to store update information of the other electronic device in the storage.

The controller may be configured to determine an update time point based on the preset period and information of the oldest operation time within the preset period among operation information for each function of each electronic device.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 4A and 4B are views illustrating update information for each function of an electronic device of a vehicle according to an embodiment;

FIG. 5 is a view illustrating operation information for each load of each electronic device in a parking mode of a vehicle according to an embodiment;

FIG. 6 is a view illustrating of operation information for each load of each electronic device during a preset period of a vehicle according to an embodiment;

FIG. 9 is a view illustrating user setting information and blocking recommended information for each function of each electronic device of a vehicle according to an embodiment.

DETAILED DESCRIPTION OF ILLUSTRATIVE EMBODIMENTS

Figure 1:
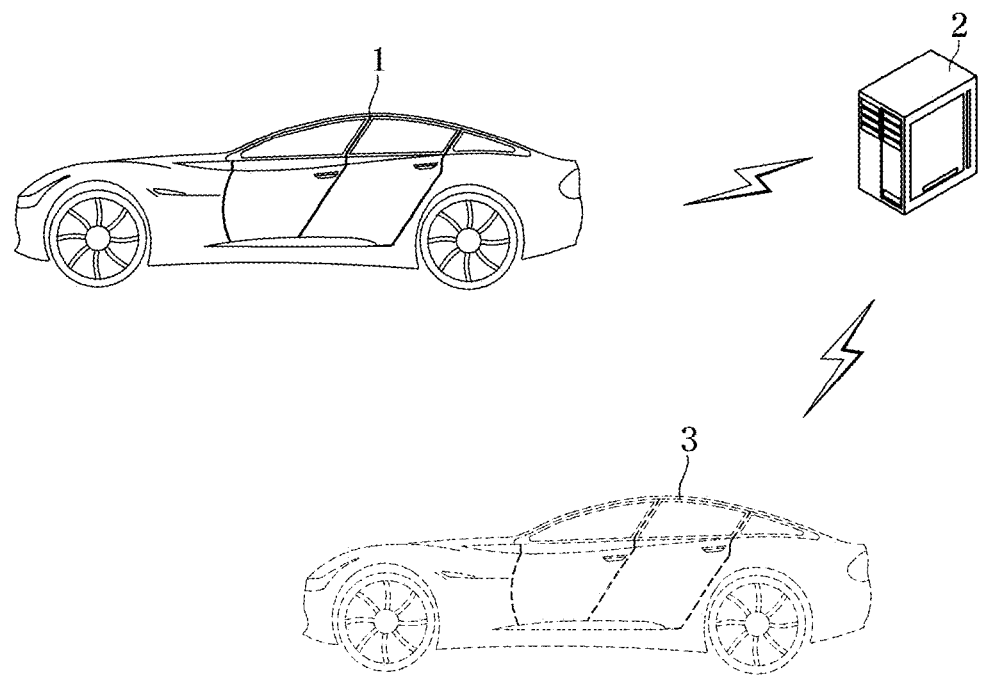
FIG. 1 is a view illustrating a configuration of a vehicle and an information providing system including the vehicle according to an embodiment.

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the disclosure will be described with reference to accompanying drawings.

FIG. 1 is a view illustrating a configuration of a vehicle and an information providing system including the vehicle according to an embodiment.

Referring to FIG. 1, a vehicle 1 may communicate with a server 2.

The vehicle 1 may include a first power supply for supplying power required for driving, and a second power supply for supplying the power to at least one electronic device provided in the vehicle 1 for user's convenience and safety during a parking mode.

In a case of internal combustion engine-driven vehicles, the first power supply may be a generator or an alternator, and the second power supply may be a battery.

In a case of eco-friendly vehicles, the first power supply may be a main battery and the second power supply may be an auxiliary battery.

The vehicle 1 may monitor execution states of a plurality of functions and operating states of a plurality of electronic devices in the parking mode, and determine at least one function and at least one electronic device to be operated in the parking mode based on monitoring information.

The vehicle 1 may perform a function selected by a user in the parking mode based on the function selected by the user and information about the electronic device, and may cause the electronic device selected by the user to operate.

Here, the function selected by the user and the information about the electronic device may be a function that is desired to operate even in the parking mode of the vehicle 1, or may be an electronic device that is desired to operate even in the parking mode.

When performing at least one function of the parking mode and controlling the operation of the electronic device, the vehicle 1 may determine the electronic device that performs at least one function, control a power control apparatus so that a dark current flows through the determined electronic device, or control the power control apparatus so that the dark current flows through the electronic device to be operated.

The vehicle 1 may transmit the function selected by the user and the information about the electronic device to the server 2, and may transmit monitoring information monitored during the parking mode to the server 2.

The vehicle 1 may store functions that can be performed during the parking mode and operation information of electronic devices that can operate, and transmit them to the server 2. The operation information may include operation time information.

The vehicle 1 may receive update software for updating at least one function or software of at least one electronic device from the server 2.

The vehicle 1 may identify the function or the electronic device for update based on the received information about the update software, and update the identified function or electronic device.

When updating any one function or software in any one electronic device, the vehicle 1 may store information about the update.

The information about the update may include version information of the updated function and information about an update date and time.

The information on the update may include version information of the updated electronic device and information about an update date and time.

The server 2 may communicate with a plurality of vehicles 1 and 3. Here, the vehicle 3 may be another vehicle of the user.

The server 2 may store the function selected by the user and the information about the electronic device transmitted from the vehicle 1. In this case, the function selected by the user and the information about the electronic device may be information about the electronic device to which the dark current is to be applied in the parking mode.

The server 2 may store information about the electronic device to which the dark current is to be applied, together with identification information of the user and identification information of the vehicle 1.

The server 2 may store each function of the parking mode received from the vehicle 1 and the operation information of each electronic device. In the parking mode, the each function and the operation information of each electronic device may be stored as history information having date and time information.

The server 2 may transmit the update software for updating various functions of the vehicles 1 and 3 or various electronic devices to the vehicles 1 and 3.

When identification information of the other vehicle 3 is received together with the identification information of the user, the server 2 may match and store the received identification information of the user with the identification information of the other vehicle 3.

The server 2 may automatically transmit the function selected by the user and the information about the electronic device to the other vehicle 3.

The server 2 may transmit the function selected by the user and the operation information about the electronic device to the other vehicle 3 in response to the user's request.

The server 2 may be a server of a manufacturing company of the vehicles 1 and 3, may be a server that sells and manages various electronic devices in the vehicles 1 and 3, and may be an information providing server for providing various types of information related to the vehicles 1 and 3 to the user.

The server 2 and the vehicles 1 and 3 may perform a V2I communication between infrastructures (i.e., structures).

Figure 2:
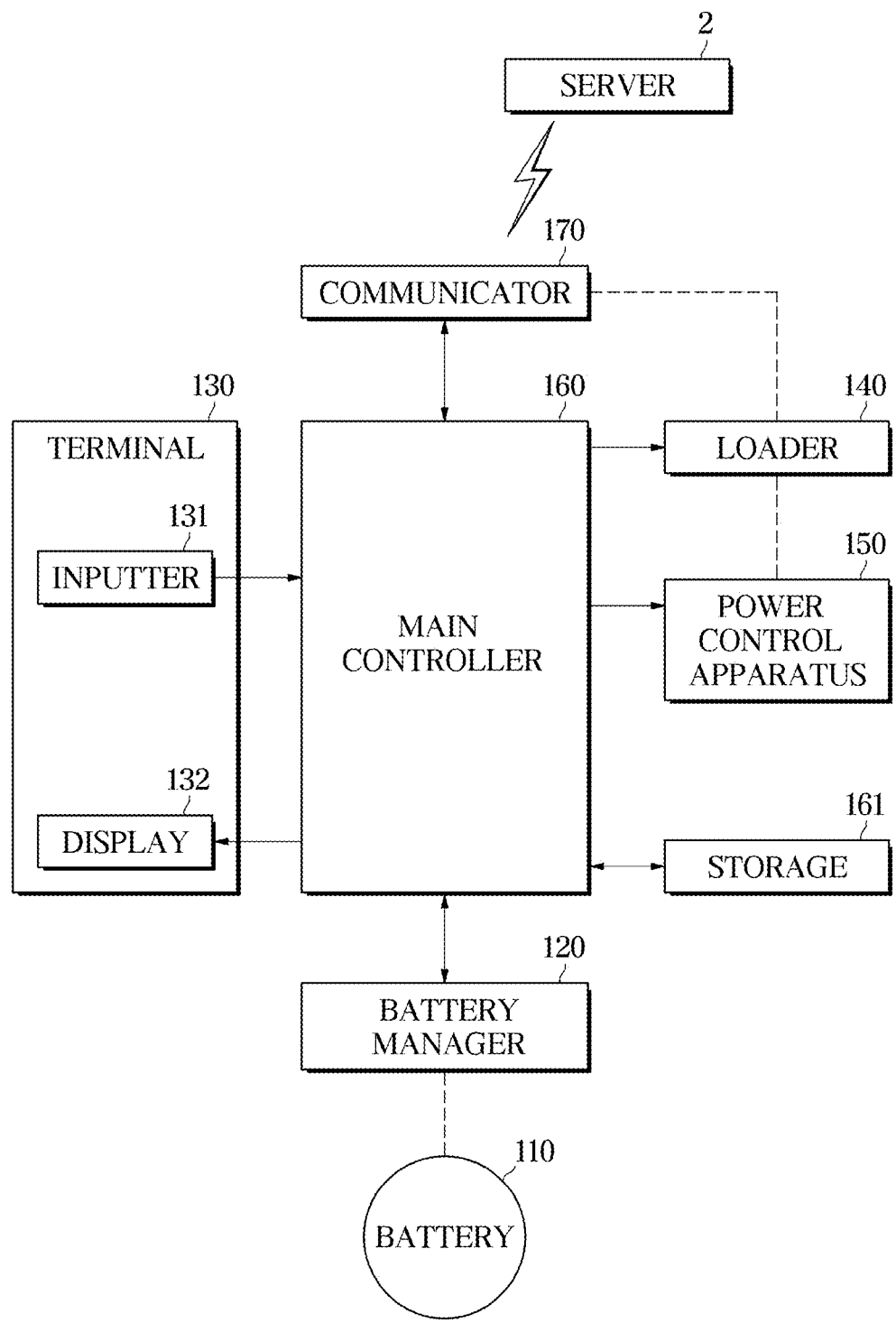
FIG. 2 is a control block diagram of a vehicle control according to an embodiment.

FIG. 2 is a control block diagram of a vehicle control according to an embodiment.

The vehicle 1 may include a battery 110, a battery manager 120, a terminal 130, a loader 140, a power control apparatus 150, a main controller 160, a storage 161, and a communicator 170.

The battery 110 may supply the power to various electronic devices provided in the vehicle 1. That is, the battery 110 may be electrically connected to the electronic devices such as various convenience devices and additional devices provided in the vehicle 1 to supply driving power to the electronic devices.

The battery 110 may supply the power to a preset electronic device in the parking mode.

The battery 110 may supply the power to the electronic device for performing a preset function in the parking mode.

The battery 110 may be a battery capable of charging and discharging.

The battery 110 may generate a high voltage current.

When the vehicle 1 is the internal combustion engine-driven vehicle or a hybrid vehicle, the battery 110 may supply the power to a starter motor when the vehicle 1 is started. The battery 110 may be charged using the power generated by the generator while the vehicle 1 is driving.

When the vehicle is the internal combustion engine-driven vehicle or the hybrid vehicle, the power generated by the generator during the driving mode may be supplied to a plurality of loads, and the power charged in the battery during the parking mode may be supplied to at least one of the plurality of loads.

When the vehicle 1 is an eco-friendly vehicle, the battery 110 may supply the power to a drive motor when the vehicle is started. In addition, the battery 110 may be charged with the power supplied from a charger disposed in a parking lot or a charging station. The battery 110 may be charged using the power generated by a motor that performs a power generation function during regenerative braking of the vehicle 1.

When the vehicle is the eco-friendly vehicle, the battery 110 may include the main battery and the auxiliary battery. The main battery may supply the power to the drive motor when the vehicle 1 is started, may be charged with the power supplied from the charger arranged in the parking lot or the charging station, and may be charged using the power generated from the drive motor that performs the power generation function during the regenerative braking of the vehicle 1. In addition, the auxiliary battery may supply the power to at least one electronic device provided in the eco-friendly vehicle for the user's convenience.

The battery manager 120 (BMS: Battery Management System) may be implemented with the main controller 160 and one processor.

The battery manager 120 may include one or more communication modules that enable communication with components inside the vehicle 1, for example, at least one of short-range communication modules, wired communication modules, or wireless communication modules.

The battery manager 120 monitors a state of charge (SOC) of the battery 110 and may transmit state information on the SOC of the battery 110 to the main controller 160 provided in the vehicle 1.

The battery manager 120 may include a current detector for detecting a current of the battery 110.

The battery manager 120 may further include a voltage detector for detecting a voltage of an output terminal of the battery 110 and a temperature detector for detecting a temperature of the battery 110.

The battery manager 120 may monitor the SOC of the battery 110 based on the detected current of the battery 110.

The battery manager 120 may monitor the SOC of the battery 110 based on the detected current and voltage of the battery 110.

The battery manager 120 may monitor the SOC of the battery 110 based on the current, voltage, and temperature of each battery cell.

Here, the SOC of the battery 110 may include an amount of charge of the battery 110.

The battery manager 120 may obtain the SOC of the battery 110 corresponding to the current, voltage, and temperature of battery cells from a table stored in advance. In the table stored in advance, the amount of charge of the battery 110 corresponding to the correlation between the current, voltage, and temperature of the battery cells may be matched.

The battery manager 120 may monitor the SOC of the battery 110 during the parking mode.

The terminal 130 may display information about a function operating in the vehicle 1 or a function operable in the vehicle 1, and may also display information input by the user.

For example, the terminal 130 may perform at least one of a navigation function, a broadcasting function, an audio function, a video function, a phone call function, a radio function, and an Internet function.

The terminal 130 may perform at least one function selected by the user, may display the operation information of the function being performed, and the like, and may display an image obtained by a camera of the vehicle 1.

The terminal 130 may include a display 132 and may further include an inputter 131.

When both the display 132 and the inputter 131 are provided in the terminal 130, the terminal 130 may be a touch screen in which the inputter 131 and the display 132 are integrally provided.

When only the display 132 is provided in the terminal 130, the inputter 131 may be provided in a head unit or a center fascia of the vehicle 1, and may be provided with at least one of buttons, switches, keys, touch panels, jog dials, pedals, keyboards, mice, trackballs, various levers, handles, and sticks.

In the embodiment, the terminal 130 in which the inputter 131 and the display 132 are integrally provided will be described.

The inputter 131 of the terminal 130 may receive a user command and a user input.

The inputter 131 may receive user identification information.

The inputter 131 may receive selection information of an electronic device or a function to be operated in the parking mode.

The inputter 131 may receive selection information of an electronic device or a function to be stopped when in the parking mode.

The inputter 131 may receive an update command of any one function or electronic device.

The inputter 131 may receive an information providing command for requesting information about the function or the electronic device to be operated in the parking mode to the server 2.

The display 132 may display information received through the inputter 131.

The display 132 may be turned off in the parking mode, and may be turned on in response to start-up.

The display 132 may display information about the electronic device or the function operating in the parking mode in response to the user command.

The display 132 may display the information about the electronic device or the function stopping in the parking mode.

The display 132 may also display the recommended information for recommending functions or electronic devices to be operated in the parking mode.

The function or the electronic device that stops in the parking mode may be an electronic device in which the function is stopped due to non-applied dark current and the dark current is not applied in the parking mode.

The function or the electronic device that stops in the parking mode may be an electronic device that performs a function by applying the dark current and to which the dark current is applied in the parking mode.

The display 132 may display automatically or manually updated functions or information about the electronic device.

The display 132 may display information received from the server 2 in response to the information providing command through the inputter 131.

The loader 140 may include the plurality of loads.

Each load is provided in the vehicle, and may be the electronic device for performing one or more functions.

Here, the functions performed in the vehicle 1 may include a driving function for driving, a safety function for safety, and a convenience function for user's convenience.

One or two or more electronic devices may be used to perform one function.

Each electronic device may perform one or two or more functions.

The electronic device may be an electronic control unit (ECU).

The electronic device may be an input device, an output device, and a detection device that operate in response to a control command of the ECU.

The electronic device that is the plurality of loads provided in the vehicle 1 will be described as an example.

The electronic device is the electronic device for performing the driving function, and may include a power generating device, a power transmission device, a steering device, a braking device, a suspension device, and a transmission device.

The electronic device is the electronic device for the user's convenience and may include a seat position adjustment member, a cluster, the inputter 131, and the display 132, and may further include an air conditioner, a radio device, an audio device, a video device, a seat heating device, a navigation device, and a black box device, and an autonomous driving device.

The electronic device is the electronic device for the user's safety and may include a warning system that outputs warning information in a dangerous situation so that the driver can recognize a danger situation of an accident, and an automatic emergency braking system (AEBS) that operates the braking device and performs an emergency braking by lowering power of an engine when another vehicle within a certain distance from a host vehicle is located in front of the host vehicle. The electronic device may include an airbag control device, an electronic stability control (ESC) that controls the vehicle's posture during acceleration or cornering of the vehicle 1, a tire pressure monitoring system (TPMS), and an anti-lock brake system (ABS) for preventing a wheel from being locked during a sudden braking.

The electronic device is the electronic device for the user's safety and may further include a camera of a surround view monitor (SVM or AVM), a camera of a blind spot detection (BSD), or a camera of a rear detection device.

The warning system includes a lane departure warning system (LDWS) that notifies a departure of a host lane, a drowsiness warning device indicating that the driver is drowsy, a blind spot warning system (BSW, BSA or BSD) that indicates a risk of collision with other vehicles located in left and right lanes of the host lane, and a forward collision warning system ((FCWS or a back warning system (BWS)) that notifies the risk of collision with other vehicles located in the front and rear of the host lane.

The vehicle 1 may further include a junction box 180 that supplies power to one or more electronic devices.

The junction box 180 may be connected to the battery manager 120 and may include one or two or more first switches a1 and a2.

The junction box 180 may supply power to one or two or more electronic devices 141 and 142 through one or two or more first switches a1 and a2.

That is, the electronic device may be connected to one or more of the first switches a1 and a2, respectively. The electronic devices 141 and 142 connected to the first switches a1 and a2 may directly receive the power through the battery 110.

The power control apparatus 150 allows the power to be supplied to the plurality of electronic devices or blocks the power supply.

The power control apparatus 150 may include one or two or more second switches b1, b2, b3, and b4.

The power control apparatus 150 may supply the power to one or two or more electronic devices 143, 144, 145, and 146 through one or two or more second switches b1, b2, b3, and b4.

That is, the electronic devices 143, 144, 145, and 146 may be respectively connected to one or more of the second switches b1, b2, b3, and b4. The electronic device 143, 144, 145, and 146 connected to the second switches b1, b2, and b3 may receive the power from the battery 110 through the junction box 180.

The first switch a1 and a2 of the junction box 180 and the second switch b1, b2, b3, and b4 of the power control apparatus 150 may be turned on or off in response to the control command of the main controller 160.

In this way, some of the plurality of electronic devices may receive the power from the battery 110 through the junction box 180, and the rest of the electronic devices may receive the power from the battery 110 through the power control apparatus 150 connected to the junction box 180.

In addition, the electronic devices that are the plurality of loads 141 to 146 may directly communicate with the communicator 170.

Each electronic device may determine whether it is operating in the parking mode. When it is determined that it has operated, each electronic device may transmit identification information of the electronic device to the communicator 170.

When it is determined that at least one function of the parking mode has been performed, each electronic device may transmit identification information of at least one function to the communicator 170.

The power control apparatus 150 may control an on/off operation of at least one electronic device based on on/off information of at least one electronic device and function among the parking modes set by the user. In this case, the power control apparatus 150 may identify the electronic device to apply the dark current based on the information stored in the parking mode and control an operation of the second switch to supply the dark current to the identified electronic device.

When one electronic device among the driving modes (i.e., a first mode) is capable of performing the plurality of functions, and in a state that can perform at least one function of the parking mode (i.e., a second mode), the power control apparatus 150 may supply the power to one electronic device.

When one electronic device among the driving modes is capable of performing the plurality of functions, and a state in which the plurality of functions is not performed among the parking modes, the power control apparatus 150 may cut off the power supplied to one electronic device.

When one electronic device among the driving modes is in a state in which one function can be performed and one of the parking modes is not performed, the power control apparatus 150 may cut off the power supplied to one electronic device.

When it is determined that an activation time has elapsed in a wake-up state of the parking mode, the power control apparatus 150 may cut off the power supplied to the electronic device in response to whether the function is performed.

The power control apparatus 150 may include a controller that controls a storage of information transmitted from the main controller 160 and controls the on/off of the second switch based on the information stored in the parking mode, and a storage for storing the on/off information of the electronic devices each connected to the second switch in the parking mode.

A storage of the power control apparatus 150 may store the on/off information of each function set by the user, and may store the on/off information of the electronic device corresponding to the on/off information of each function.

The loads may be classified into a state in which the start is turned off depending on a time when the power is supplied in the parking mode, that is, a constant load that operates by receiving the power at all times, a periodic load that operates periodically by receiving the power at a period, and an event load that operates by receiving the power when an event occurs during the parking mode.

Among them, the periodic loads may automatically wake up when it is determined that a current time is a preset time based on time information obtained by a timer provided inside and preset time information, perform at least one function, and switch to a sleep mode when the performing at least one function is completed. In this case, the periodic loads may store operation information according to function execution and transmit it to the main controller 160.

The event loads may perform wake-up when a wake-up signal is received through communication, perform at least one function, and transmit wake-up signals to other loads associated with them. In this case, the other loads may wake up in response to reception of the wakeup signal, and may perform the at least one function.

The event loads may also store the operation information according to the function execution and transmit it to the main controller 160.

The periodic load and the event load may transmit the operation information according to the function execution to the main controller 160 when a starting signal is received or the communicator wakes up.

When describing the configuration of the main controller 160, the load provided in the vehicle 1 is described as the electronic device.

The main controller 160 may control the display 132 to output update request information for the electronic devices and functions when it is determined that an initial start-on command has been received. When the update request information is received through the inputter 131, the main controller 160 may transmit request information of the update software and the identification information of the vehicle 1 to the server 2. In this case, the main controller 160 may transmit the identification information of the user to the server 2 together.

When it is determined that the initial start-on command has been received, the main controller 160 may automatically transmit the request information of the update software and the identification information of the vehicle 1 to the server 2.

When the update software is received from the server 2, the main controller 160 may identify the function or electronic device corresponding to the received update software, update the identified function or electronic device using the update software, and store the update information in the storage 161. In this case, the main controller 160 may store the update information for each function of each electronic device in a first database of the storage 161.

This will be described with reference to FIGS. 4A and 4B.

FIG. 4A is an exemplary view of list information for each function of each electronic device stored in the storage 161 of the vehicle 1, and FIG. 4B is an exemplary view of list information in which the update information for each function of each electronic device stored in the server 2 is matched.

The list information for each function of each electronic device may further include identification information of each electronic device, identification information of each function, information about whether each electronic device can be turned off, and information about whether each electronic device can be turned off for each function.

Referring to FIGS. 4A and 4B, the main controller 160 may change and store the list information stored in the storage 161 of the vehicle 1 into list information received from the server 2.

The main controller 160 may recognize a current mode of the vehicle 1 as the parking mode when the start is turned off.

The main controller 160 may identify the electronic device operated during the parking mode and store the identification information and the operation information of the identified electronic device.

When the start is turned on, the main controller 160 may receive the operation information from the electronic device operated during the parking mode. That is, when the start is turned on, the main controller 160 may receive the identification information of the electronic device and the identification information of the function from the electronic device operating during the parking mode.

When the communicator 170 wakes up, the main controller 160 may receive the operation information from the electronic device operating during the parking mode.

Referring to FIG. 5, the main controller 160 may identify a number of operations for each function and a last operation time during the parking mode between a start-off time point and a start-on time point based on the received operation information of the plurality of electronic devices, and may store information about the number of identified operations for each function and the last operation time. The main controller 160 may store information about the number of operations for each function and the last operation time of each electronic device in a second database.

Referring to FIG. 6, the main controller 160 may store information about the number of operations for each function and the last operation time of the electronic device operated during the parking mode during a preset period as the second database.

The main controller 160 may update the second database based on information about the number of operations for each function and the last operation time of each electronic device between the start-off time point and the start-on time point. That is, the main controller 160 may update the second database based on the stored information of the second database and the operation information for each function of each electronic device between the start-off time point and the start-on time point.

The main controller 160 may monitor operation states of the plurality of electronic devices in the parking mode and determine operating characteristics of the electronic devices based on the monitored operation information.

The main controller 160 may determine the operating characteristics of electronic devices based on information of the second database and the operation information for each function of each electronic device between the start-off time point and the start-on time point.

In addition, identification information of constantly operating electronic devices may be stored in advance.

The main controller 160 may determine an operation type for an operation time point of the electronic devices based on the operation information received from the plurality of electronic devices.

The main controller 160 may distinguish electronic devices that perform the operation in the parking mode into an electronic device that operates by wake-up through communication and an electronic device that does not operate even by wake-up through communication.

The electronic device that operates by wake-up through communication may be an event type electronic device. In addition, then electronic device that does not operate even by wake-up through communication may be a periodic electronic device.

The main controller 160 may generate blocking recommended information based on the operating characteristics of the electronic device in the parking mode.

The main controller 160 may transmit the wake-up signal to any one electronic device based on a predetermined condition or a signal of an external trigger.

The main controller 160 may update the wake-up electronic devices.

The main controller 160 may update the first database that stores information about software of each electronic device and the second database that stores information about data in each electronic device.

The main controller 160 may update the software of at least one electronic device based on software update information of the at least one electronic device received from the server 2, and determine whether a function performed by the at least one electronic device has been added or changed. When it is determined that the function performed by the at least one electronic device has been added or changed, the main controller 160 may update the first database.

The main controller 160 may monitor the plurality of electronic devices, and request an update of the replaced electronic device from the server 2 when it is determined that the at least one electronic device has been replaced. When it is determined that the update software is received from the server 2, the main controller 160 may update the software of the at least one electronic device and update the first database.

When a start-on command is received through the inputter 131, the main controller 160 may transmit the operation information for each function of each electronic device in the parking mode to the power control apparatus 150. Here, the parking mode may be a state between the start-off time point and the start-on time point.

When the start-on command is received through the inputter 131, the main controller 160 may determine whether the power control apparatus 150 is capable of receiving information. When it is determined that the power control apparatus 150 is capable of receiving information, the main controller 160 may transmit the operation information for each operation of each electronic device in the parking mode to the power control apparatus 150. When it is determined that the power control apparatus 150 is in a state in which information reception is impossible, the main controller 160 may wait for transmission of the operation information for each function of each electronic device in the parking mode.

For example, when the start-on command is received through the inputter 131, the main controller 160 may determine whether a preset predetermined time has elapsed from a start-on command time point. When it is determined that the preset predetermined time has elapsed from the start-on command time point, the main controller 160 may transmit the operation information for each function of each electronic device in the parking mode to the power control apparatus 150.

As another example, when the start-on command is received through the inputter 131, the main controller 160 may determine whether the preset predetermined time has elapsed from the start-on command time point. When it is determined that the preset predetermined time has elapsed from the start-on command time point, the main controller 160 may determine a driving speed based on speed information detected by a speed detector. When it is determined that the determined driving speed is greater than or equal to a preset driving speed, the main controller 160 may transmit the operation information for each function of each electronic device in the parking mode to the power control apparatus 150.

Figure 7:
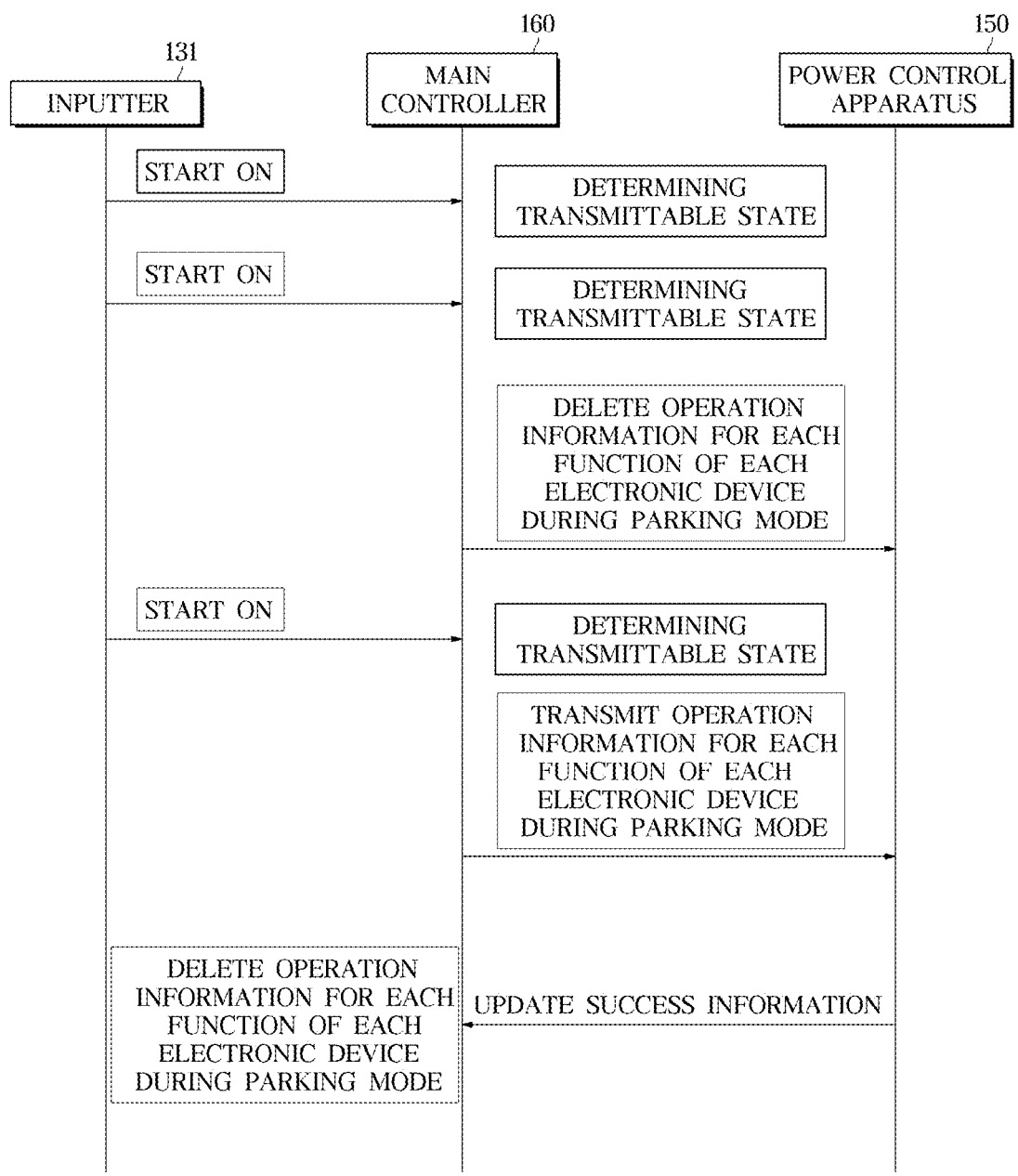
FIG. 7 is a view illustrating information transmission from a main controller of a vehicle to a power control apparatus according to an embodiment.

Referring to FIG. 7, the main controller 160 may determine whether update success information has been received from the power control apparatus 150. When it is determined that the update success information has not been received from the power control apparatus 150, the main controller 160 may transmit the operation information for each function of each electronic device in the parking mode to the control apparatus 150.

When it is determined that the update success information has been received from the power control apparatus 150, the main controller 160 may delete the operation information for each function of each electronic device in the parking mode.

The main controller 160 does not delete the operation information for each function of each electronic device in the parking mode until the update success information is received from the power control apparatus 150.

The main controller 160 may transmit the operation information for each function of each electronic device in the parking mode. When it is determined that a start-off command is received while the update success information is not received from the power control apparatus 150, the main controller 160 may store the operation information for each function of each electronic device in the parking mode as unconfirmed information.

When the start-on command is received, the main controller 160 may transmit an update success confirmation command for update unconfirmed information to the power control apparatus 150, and retransmit or delete the operation information for each function of each electronic device in the previous parking mode based on the update confirmation information received from the power control apparatus 150.

The main controller 160 may transmit the operation information for each function of each electronic device in the parking mode. When it is determined that the start-off command has been received while the update success information has not been received from the power control apparatus 150, the main controller 160 may add and store the operation information for each function of each electronic device in a current parking mode to the operation information for each function of the electronic device in the previous parking mode.

The main controller 160 may control the display 132 to identify the electronic device and function to be recommended to the user based on information stored in the first and second databases and to display the identified electronic device and function as operation recommended information.

The main controller 160 may control the display 132 to identify the electronic devices and functions to be stopped in the parking mode based on the information stored in the first and second databases and to display the identified electronic devices and functions as the blocking recommended information.

For example, the main controller 160 may recognize the electronic device or function whose number of uses for the preset period is less than a reference number of times as the blocking recommended information and control the display of the recognized blocking recommended information.

As another example, the main controller 160 may identify a past time corresponding to the preset period based on a current time point. When a last use time of at least one electronic device or at least one function is earlier than the past time, the main controller 160 may recognize at least one electronic device or at least one function as the blocking recommended information and control the display of the recognized blocking recommended information.

For example, in the parking mode, an expiration date of function A-2 and function B-1 for the main controller 160 has passed 2 months. Will the main controller 160 turn off at least one of the function A-2 and the function B-1? You can control the display 132 to output guide information.

The main controller 160 may control display of operable electronic devices and functions in the parking mode. When at least one selection information is received through the inputter 131, the main controller 160 may set the electronic device or the function corresponding to the received selection information as the electronic device to be operated in the parking mode.

Figure 8:
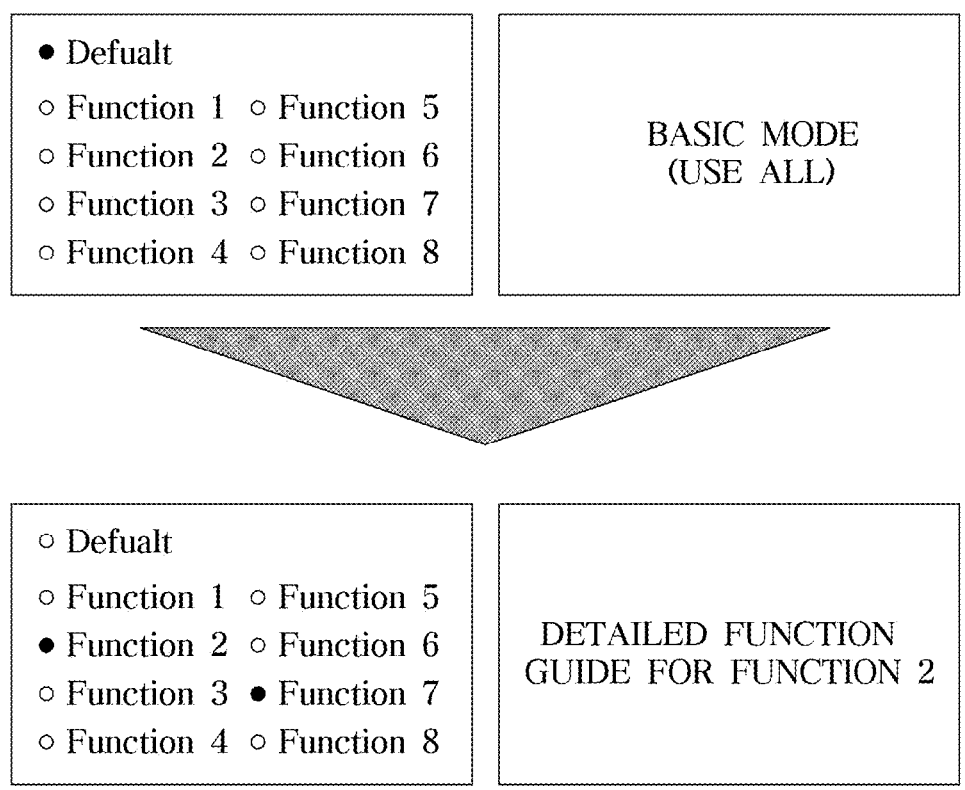
FIG. 8 is an exemplary diagram of user settings for each function through an inputter of a vehicle according to an embodiment.

Referring to FIG. 8, in response to a control command of the main controller 160, the terminal may display functions that are operable in the parking mode, functions selected by the user, and display the guide information for the selected function.

When it is determined that the electronic device or the function to be operated in the parking mode is set by the user, or that a reference time has elapsed from a last update time point, the main controller 160 may update the blocking recommended information.

The reference time may be determined by subtracting the last use time (e.g., 25 days, see FIG. 6) of the function used the longest in the preset period from the preset period (e.g., 30 days). When described with reference to FIG. 6, the reference time may be determined as a time corresponding to 5 days.

The main controller 160 may control the on/off operation of at least one electronic device based on the on/off information of at least one electronic device and function among the parking modes set by the user.

The main controller 160 may transmit the information about the on/off operation of at least one electronic device in the parking mode to the junction box 180 and the power control apparatus 150.

When the one electronic device of the driving modes is in a state in which the plurality of functions can be performed, and in a state in which at least one function of the parking mode can be performed, the main controller 160 may display one function off as the blocking recommended information.

As illustrated in FIG. 9, the main controller 160 may store user setting information and the blocking recommended information for each function of the operable electronic device during the parking mode, and may also store information about an activation time for each function.

The main controller 160 may transmit the user setting information and the blocking recommended information for each function of the electronic device capable of operating in the parking mode to the power control apparatus 150.

When it is determined that the activation time has elapsed in the wake-up state of the parking mode, the main controller 160 may cut off the power supplied to the electronic device in response to whether the function is performed.

In the embodiment, the main controller 160 and the power control apparatus 150 have been described separately, but it is also possible to integrate the main controller 160 and the power control apparatus 150.

The main controller 160 may request the update information about the plurality of electronic devices and the plurality of functions from the server 2. When the update information about the plurality of electronic devices and the plurality of functions is received from the server 2, the main controller 160 may compare the update information of the plurality of electronic devices stored in the storage 161 with the update information of the plurality of electronic devices received from the server 2, and may compare the update information of the plurality of functions stored in the storage 161 with the update Information of the plurality of functions received from the server 2.

The main controller 160 may identify the electronic device or the function for which the update has not been performed, and update the identified electronic device or function. In this case, the main controller 160 may request the update software of the electronic device that has not been updated from the server 2, and may request the update software of the function that has not been updated from the server 2.

The main controller 160 may perform the update of at least one function when the update software for the at least one function is received, and perform the update of at least one electronic device when the update software for the at least one electronic device is received.

The main controller 160 may store the update information about the plurality of electronic devices and the plurality of functions. The update information may include software version information and time information for performing the update.

The main controller 160 may identify the electronic device to which the dark current is to be applied based on information stored in the parking mode and control the operation of the first switch in the junction box 180 to supply the dark current to the identified electronic device. Here, the information stored in the storage 161 may include the function to be operated in the parking mode set by the user and information about the electronic device to be operated in the parking mode.

The main controller 160 may control the battery 110 so that the dark current is applied to the electronic device set in advance during the parking mode, and may block the dark current to the other electronic devices.

When the current mode is recognized as the parking mode, the main controller 160 may determine the operating load among the plurality of loads provided in the vehicle 1 based on the current information detected by the current detector. Here, the load in operation may be a load through which the dark current flows.

The storage 161 may store the on/off information of the electronic device and the function set by the user.

The storage 161 may store the operation information for the plurality of electronic devices and functions operated during the parking mode.

The storage 161 may accumulate and store the operation information for the plurality of electronic devices and functions operated during the parking mode for the preset period.

The storage 161 may store the identification information of the electronic device (i.e., the load) connected to the junction box 180, and may store the identification information of the first switch connected to the electronic device (i.e., the load) connected to the junction box 180.

The storage 161 may store the identification information of the electronic device (i.e., the load) connected to the power control apparatus 150 and may store the identification information of the second switch connected to the electronic device (i.e., the load) connected to the power control apparatus 150.

The storage 161 may store the update information on the plurality of electronic devices and the plurality of functions.

The storage 161 may be implemented with at least one of the non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as a hard disk drive (HDD) or a compact disk (CD) ROM, without being limited thereto.

The storage 161 may be a memory implemented with a chip separate from the aforementioned processor in relation to the main controller 160, or may be implemented integrally with the processor in the single chip.

The communicator 170 may enable communication between various devices provided in the vehicle 1.

The communicator 170 may perform CAN communication, USB communication, Wi-Fi communication, and Bluetooth communication, and may further perform broadcasting communication such as TPEG, SXM, and RDS such as DMB, and 2G, 3G, 4G, and 5G communication.

The communicator 170 may include at least one communication module configured to communicate with an external device. The communication module may be a hardware device implemented by various electronic circuits, e.g., processor, to transmit and receive signals via wireless or wired connections. For example, the communicator 170 may include at least one of a short-range communication module, a wired communication module, and a wireless communication module. Here, the external device may be the server 2.

The short-range communication module may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

The wired communication module may include a variety of wired communication module, e.g., Controller Area Network (CAN) module, Local Area Network (LAN) module, Wide Area Network (WAN) module, or Value Added Network (VAN) module and a variety of cable communication module, e.g., Universal Serial Bus (USB), High Definition Multimedia Interface (HDMI), Digital Visual Interface (DVI), recommended standard 232 (RS-232), power line communication or plain old telephone service (POTS).

The wireless communication module may include a wireless communication module supporting a variety of wireless communication methods, e.g., Wi-Fi module, Wireless broadband module, global System for Mobile (GSM) Communication, Code Division Multiple Access (CDMA), Wideband Code Division Multiple Access (WCDMA), Time Division Multiple Access (TDMA), and Long Term Evolution (LTE).

Figure 3:
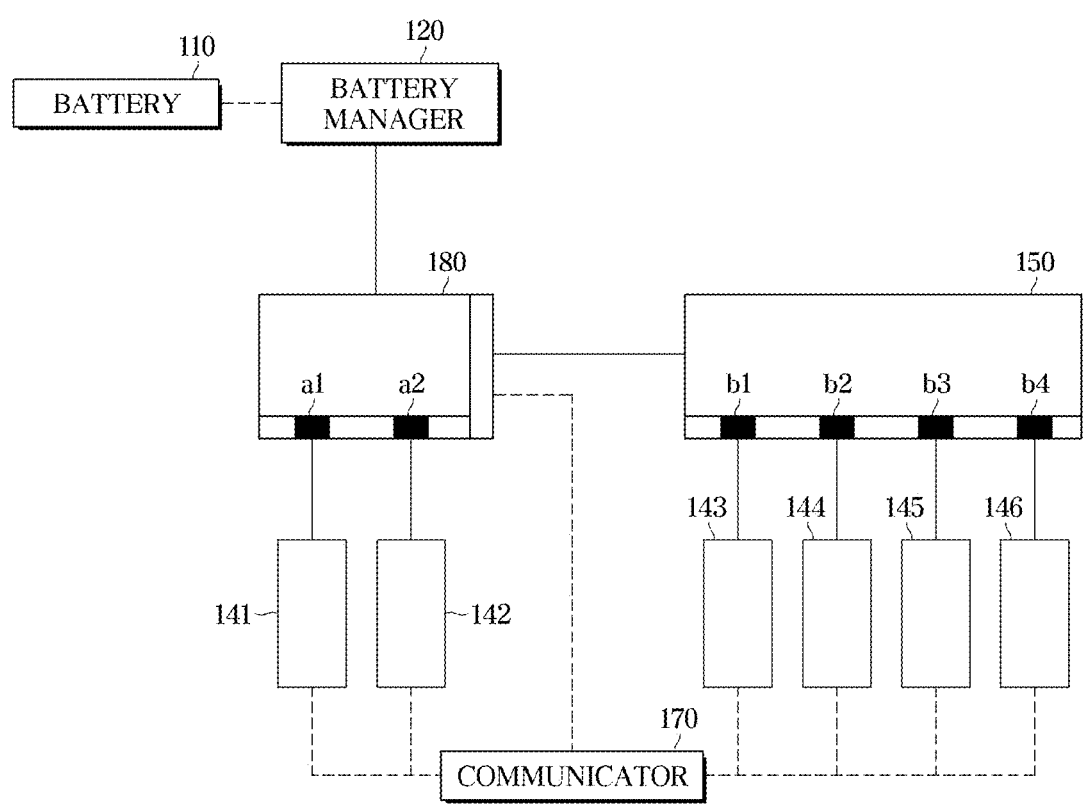
FIG. 3 is a detailed block diagram of a power control apparatus provided in a vehicle according to an embodiment.

At least one component may be added or deleted according to the performance of the components illustrated in FIGS. 2 and 3. In addition, it will be readily understood by those of ordinary skill in the art that the mutual positions of the components may be changed corresponding to the performance or structure of the system.

Meanwhile, each component illustrated in FIGS. 2 and 3 may refer to software and/or hardware components such as Field Programmable Gate Array (FPGA) and Application Specific Integrated Circuit (ASIC).

According to the embodiment of the disclosure, the disclosure may recognize a function actually used by the user in the parking mode, and cut off the power supplied to an unused load based on information about the recognized function. As a result, unnecessary power consumption during the parking mode may be prevented, and the life of the battery may be prolonged by preventing the over-discharge of the battery.

The disclosure may determine useful functions or functions that are not actually used by monitoring the operating state of the load in the parking mode, and provide information about a function to be operated in the parking mode as the recommended information based on the determination result. In this case, the disclosure may supply the power only to a load for performing a function selected by the user in the parking mode. Through this, the user's convenience may be improved.

According to the disclosure, even if the user changes the vehicle, the same setting may be applied to the changed vehicle, thereby improving the user's convenience.

The disclosure may improve the quality and marketability of the vehicle, and further improve the user's convenience and a safety of the vehicle, and secure a competitiveness of a product.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a non-transitory computer-readable recording medium.

The non-transitory computer-readable recording medium may include all types of recording media storing commands that may be interpreted by a computer. For example, the non-transitory computer-readable recording medium may be, for example, ROM, RAM, a magnetic tape, a magnetic disc, flash memory, an optical data storage device, and the like.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A power control apparatus comprising:
    a plurality of switches configured to be respectively connected to a plurality of loads;
    a storage configured to store identification information of the plurality of loads operable during execution of a first mode and identification information of at least one load operable during execution of a second mode, and to store identification information of the switches matched with the identification information of each load; and
    a controller configured to control turn-on of at least one switch among the plurality of switches to supply power of a battery to the at least one load based on the identification information stored in the storage during the execution of the second mode.

2. The power control apparatus according to claim 1, wherein the controller is configured to identify the load operating during the execution of the second mode, and to store operation information about identification information of the identified load, identification information of a function performed by the load, a number of operations, and a last operation time.

3. The power control apparatus according to claim 2, wherein the controller is configured to update the operation information stored in the storage based on the operation information about the stored identification information of the identified load, the identification information of the function performed by the load, the number of operations, and the last operation time during the execution of the first mode.

4. The power control apparatus according to claim 1, wherein:
    the at least one load is some of the plurality of loads; and
    the controller is configured to control turn-off of the remaining switches so that the power supplied to the remaining loads is cut off during the execution of the second mode.

5. The power control apparatus according to claim 1, wherein the controller is configured to control the turn-on of the plurality of switches to supply power of a first power supply to the plurality of loads based on a current mode being the first mode, and to control the turn-on of the at least one switch to supply power of a second power supply including the battery to the at least one load based on the current mode being the second mode.

6. A vehicle comprising:
    a storage;
    a plurality of loads configured to perform at least one function;
    a power control apparatus configured to cut off power supplied to the plurality of loads, respectively; and
    a controller configured to identify at least one load supplied with the power through the power control apparatus during execution of a parking mode for a preset period, and to match operation information of the identified at least one load with identification information of the at least one load and store it in the storage.

7. The vehicle according to claim 6, wherein the controller is configured to:
    identify operation information for each function of each load operated during the execution of the parking mode for the preset period;
    based on the operation information for each function of the identified each load, determine whether there is a load to be cut off a power supply during the execution of the parking mode; and
    update the operation information of the storage based on the identification information of the determined load based on determining that there is the load to be cut off the power supply during the execution of the parking mode.

8. The vehicle according to claim 7, wherein the operation information for each function of each load comprises:
    the identification information of each load, identification information of the at least one function performed in each of the loads, information of a number of operations of the at least one function performed in each of the loads, and information about a last operation time of the at least one function performed in each of the loads.

9. The vehicle according to claim 7, further comprising:
    an inputter; and
    a display;
    wherein the controller is configured to:
        control the display to display blocking recommended information for a load that will cut off the power supply of the power control apparatus while performing the parking mode based on the operation information for each function of each load;
        identify the load to cut off the power supply corresponding to a user input received through the inputter; and
        update the operation information stored in the storage based on the identification information of the identified load.

10. The vehicle according to claim 7, wherein the controller is configured to:
    determine whether a predetermined time has elapsed from a time point when a start-on command is received based on the start-on command being received; and
    transmit the operation information for each function of each load in the parking mode to the power control apparatus based on determining that the predetermined time has elapsed from the time point when the start-on command is received.

11. The vehicle according to claim 10, wherein the controller is configured to:
    delete the operation information for each function of each load in the parking mode based on receiving update success information from the power control apparatus; and
    retransmit the operation information for each function of each load in the parking mode based on not receiving the update success information from the power control apparatus.

12. The vehicle according to claim 7, further comprising:
    a speed detector configured to detect a driving speed;
    wherein the controller is configured to:
        determine whether a predetermined time has elapsed from a time point when a start-on command is received based on the start-on command being received;

determine whether the driving speed detected by the speed detector is equal to or greater than a preset speed based on determining that the predetermined time has elapsed; and transmit the operation information for each function of each load in the parking mode based on determining that the driving speed detected by the speed detector is equal to or greater than the preset speed.

13. The vehicle according to claim 6, wherein each of the plurality of loads is configured to transmit the operation information to the controller based on determining that it has operated using the power supplied from the power control apparatus while performing the parking mode.

14. The vehicle according to claim 13, wherein the loads operating by a wake-up of a communicator among the plurality of loads are configured to transmit operation information for each function to the controller at an operation time point.

15. The vehicle according to claim 13, wherein the loads operating according to preset time information among the plurality of loads are configured to transmit operation information for each function to the controller at a start-on command or a wake-up time point of a communicator.

16. The vehicle according to claim 6, further comprising:
a communicator configured to perform a communication with a server;
wherein the controller is configured to:
transmit information about the plurality of loads to the server based on receiving an initial start-on command; and
control updates of the plurality of loads based on update information of the plurality of loads received from the server and store information about the updates of the plurality of loads.

17. The vehicle according to claim 6, further comprising:
an inputter; and
a display;
wherein the controller is configured to update the information of the storage based on selection information in response to receiving the selection information of a function to be turned off during the parking mode through the inputter.

18. The vehicle according to claim 6, further comprising:
a communicator configured to perform a communication with a server;
wherein the controller is configured to:
based on determining that at least one electronic device has been replaced with another electronic device, control an update of the other electronic device by receiving a software for updating the other electronic device from the server; and
store update information of the other electronic device in the storage.

19. The vehicle according to claim 6, further comprising:
a communicator configured to perform a communication with a server;
wherein the controller is configured to:
control an update of a new electronic device by receiving a software for updating the new electronic device from the server based on determining that it has been added as the new electronic device; and
store update information of the other electronic device in the storage.

20. The vehicle according to claim 6, wherein the controller is configured to determine an update time point based on the preset period and information of the oldest operation time within the preset period among operation information for each function of each electronic device.

* * * * *